US012508808B2

(12) United States Patent
Ueda et al.

(10) Patent No.: US 12,508,808 B2
(45) Date of Patent: Dec. 30, 2025

(54) LIQUID DISCHARGE HEAD, LIQUID DISCHARGE DEVICE, AND LIQUID DISCHARGE APPARATUS

(71) Applicants: Keiji Ueda, Kanagawa (JP); Takahiko Kuroda, Hyogo (JP); Toshiaki Masuda, Kanagawa (JP); Kaname Morita, Kanagawa (JP)

(72) Inventors: Keiji Ueda, Kanagawa (JP); Takahiko Kuroda, Hyogo (JP); Toshiaki Masuda, Kanagawa (JP); Kaname Morita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 175 days.

(21) Appl. No.: 18/271,848

(22) PCT Filed: Jan. 19, 2022

(86) PCT No.: PCT/IB2022/050416
§ 371 (c)(1),
(2) Date: Jul. 12, 2023

(87) PCT Pub. No.: WO2022/162502
PCT Pub. Date: Aug. 4, 2022

(65) Prior Publication Data

US 2024/0066865 A1 Feb. 29, 2024

(30) Foreign Application Priority Data

Jan. 27, 2021 (JP) ................................ 2021-010946

(51) Int. Cl.
*B41J 2/14* (2006.01)

(52) U.S. Cl.
CPC .. *B41J 2/14233* (2013.01); *B41J 2002/14491* (2013.01); *B41J 2202/15* (2013.01)

(58) Field of Classification Search
CPC .......... B41J 2/14233; B41J 2002/14491; B41J 2202/15; B41J 2/1606; B41J 2002/1437; B41J 2202/13
See application file for complete search history.

(56) References Cited

U.S. PATENT DOCUMENTS

2006/0221129 A1 10/2006 Silverbrook
2006/0232638 A1 10/2006 Kuroda et al.
(Continued)

FOREIGN PATENT DOCUMENTS

CN 101326060 A 12/2008
CN 108340680 A 7/2018
(Continued)

OTHER PUBLICATIONS

Mcavoy Gregory John, "Droplet Ejector" (WO 2018054917), Mar. 29, 2018, [pp. 1-2, 22, 25-30] (Year: 2018).*
(Continued)

*Primary Examiner* — Lisa Solomon
(74) *Attorney, Agent, or Firm* — XSENSUS LLP

(57) ABSTRACT

A liquid discharge head includes a nozzle layer having a nozzle through which a liquid is discharged from a second side toward a first side, a liquid chamber substrate, and a drive circuit. The nozzle layer includes a vibration layer, a piezoelectric actuator adjacent to the nozzle and over the first side, a circuit connection over the first side, a first protective layer around the circuit connection, a second protective layer over the piezoelectric actuator, a first water-resistant film over the first protective layer, and a second water-resistant film over the second protective layer. The second protective layer is separated from the first protective layer. The first protective layer defines an opening above the circuit connection. The liquid chamber substrate has a liquid chamber communicating with the nozzle. The drive circuit is
(Continued)

disposed over the second side and connected to the circuit connection to drive the piezoelectric actuator.

14 Claims, 9 Drawing Sheets

(56) References Cited

U.S. PATENT DOCUMENTS

| | | | |
|---|---|---|---|
| 2008/0309734 A1 | 12/2008 | Nishimura et al. | |
| 2011/0293452 A1 | 12/2011 | Kim et al. | |
| 2012/0236083 A1 | 9/2012 | Mizukami et al. | |
| 2014/0063095 A1 | 3/2014 | Yokoyama et al. | |
| 2014/0267498 A1 * | 9/2014 | Yokoyama | B41J 2/14233 347/45 |
| 2014/0267506 A1 | 9/2014 | Ohnishi et al. | |
| 2015/0070444 A1 | 3/2015 | Ishimori et al. | |
| 2017/0072692 A1 | 3/2017 | Chen et al. | |
| 2019/0270310 A1 | 9/2019 | Masuda et al. | |
| 2019/0283424 A1 | 9/2019 | McAvoy | |
| 2020/0230957 A1 | 7/2020 | Wong et al. | |
| 2020/0269575 A1 | 8/2020 | Kobayashi et al. | |
| 2021/0039393 A1 | 2/2021 | Mizukami et al. | |
| 2021/0162759 A1 | 6/2021 | Miwa et al. | |
| 2021/0252862 A1 | 8/2021 | Masuda | |

FOREIGN PATENT DOCUMENTS

| | | | |
|---|---|---|---|
| CN | 110520302 A | 11/2019 | |
| JP | 7-040536 | 2/1995 | |
| JP | 2000-289201 | 10/2000 | |
| JP | 2011-245845 A | 12/2011 | |
| JP | 2013-014121 | 1/2013 | |
| JP | 2019-530601 | 10/2019 | |
| WO | WO-2018054917 A1 * | 3/2018 | B41J 2/14201 |

OTHER PUBLICATIONS

Office Action issued Jul. 2, 2024 in Japanese Patent Application No. 2021-010946, 7 pages.
International Search Report and Written Opinion issued on Apr. 22, 2022 in PCT/IB2022/050416 filed on Jan. 19, 2022, 8 pages.
Office Action issued May 12, 2025 in Chinese Patent Application No. 202280008519.7, 8 pages.
The notification issued Sep. 23, 2025 in Chinese Patent Application No. 202280008519.7, total 4 pages.

* cited by examiner

FIG. 9 COMPARATIVE EXAMPLE
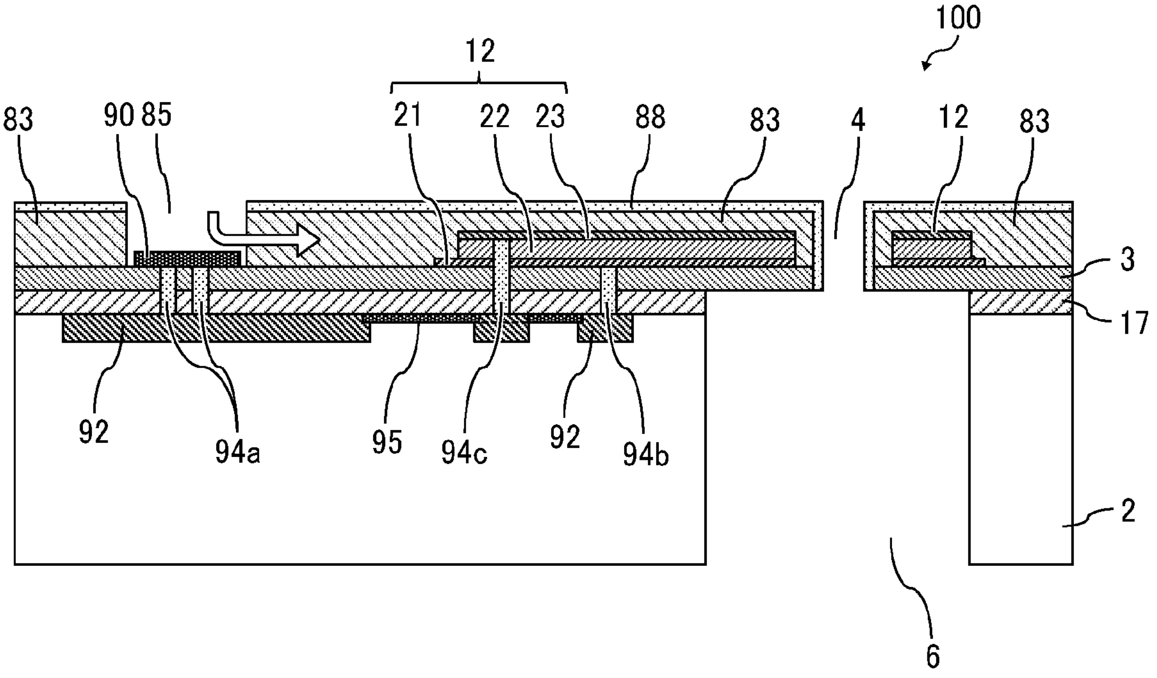

LIQUID DISCHARGE HEAD, LIQUID DISCHARGE DEVICE, AND LIQUID DISCHARGE APPARATUS

CROSS-REFERENCE TO RELATED APPLICATIONS

This application is based on PCT filing PCT/IB2022/050416, filed on Jan. 19, 2022, which claims priority to Japanese Application No. 2021-010946, filed on Jan. 27, 2021, the entire disclosure of each is hereby incorporated by reference herein.

TECHNICAL FIELD

Aspects of the present disclosure relate to a liquid discharge head, a liquid discharge device, and a liquid discharge apparatus.

BACKGROUND ART

There is known an inkjet head including a nozzle layer having a nozzle and a liquid chamber substrate having a liquid chamber. In such an inkjet head, a piezoelectric actuator is disposed in the nozzle layer.

In the above-described inkjet head, the piezoelectric actuator is disposed adjacent to the nozzle to discharge ink, and a drive circuit is disposed in the liquid chamber substrate to drive the piezoelectric actuator. In this case, a circuit connection is provided to supply power to the drive circuit.

In PTL 1, the piezoelectric actuator is disposed in at least a part of a nozzle portion of the nozzle layer and over a side of the nozzle layer from which liquid is discharged. A bonding pad (also referred to as the circuit connection) is disposed over the side of the nozzle layer from which the liquid is discharged to energize the drive circuit that drives the piezoelectric actuator. Further, a protective layer is disposed on the side of the nozzle layer from which the liquid is discharged to protect the piezoelectric actuator. The protective layer is opened at portions of the nozzle and the bonding pad.

CITATION LIST

Patent Literature

[PTL 1]
Japanese Unexamined Patent Application Publication No. 2019-530601

SUMMARY OF INVENTION

Technical Problem

The protective layer includes, for example, a polyimide-based resin that has high hygroscopicity. If moisture is absorbed (enters) through the protective layer having high hygroscopicity into the piezoelectric actuator below the protective layer, the piezoelectric actuator may deteriorate in performance. Therefore, a water-resistant film is generally formed over the protective layer.

In a manufacturing process of the inkjet head as a comparative technique, a piezoelectric actuator, an electrode pad (bonding pad), a protective layer, a water-resistant film, and a pad opening that exposes the electrode pad are generally formed in this order. Accordingly, the water-resistant film is not present on the side surface of the protective layer facing the pad opening.

As a result, in the comparative technique, moisture is absorbed from the pad opening above the bonding pad (circuit connection), and the piezoelectric actuator may deteriorate in performance. If moisture in the outside air is absorbed from the pad opening above the circuit connection, the moisture may erode the piezoelectric actuator, and the piezoelectric actuator may deteriorate. The moisture absorption may shorten the life of the inkjet head and may decrease the reliability of the inkjet head.

As described above, in a liquid discharge head including a nozzle layer in which a piezoelectric actuator and a circuit connection are disposed, moisture absorption from an opening above the circuit connection may cause the piezoelectric actuator to deteriorate. To solve such a situation, the present disclosure has an object to provide a liquid discharge head that can prevent the piezoelectric actuator from deteriorating in the piezoelectric performance.

Solution to Problem

A liquid discharge head includes a nozzle layer having a nozzle through which a liquid is discharged, a liquid chamber substrate, and a drive circuit. The nozzle layer includes a vibration layer having a first side and a second side opposite to the first side, a piezoelectric actuator adjacent to the nozzle and over the first side, a circuit connection over the first side, a first protective layer around the circuit connection, a second protective layer over the piezoelectric actuator, a first water-resistant film over a surface of the first protective layer, and a second water-resistant film over a surface of the second protective layer. The liquid is discharged through the nozzle in a direction from the second side toward the first side. The second protective layer is separated from the first protective layer. The first protective layer defines an opening above the circuit connection. The liquid chamber substrate has a liquid chamber communicating with the nozzle. The drive circuit is disposed over the second side and connected to the circuit connection to drive the piezoelectric actuator.

Advantageous Effects of Invention

According to the present disclosure, the liquid discharge head can be provided that includes the nozzle layer in which the piezoelectric actuator and the circuit connection are disposed and prevents the deterioration of piezoelectric performance of the piezoelectric actuator due to the moisture absorption from the opening above the circuit connection.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 9 is a schematic cross-sectional view of a liquid discharge head according to a comparative example.

DESCRIPTION OF EMBODIMENTS

Figure 1:
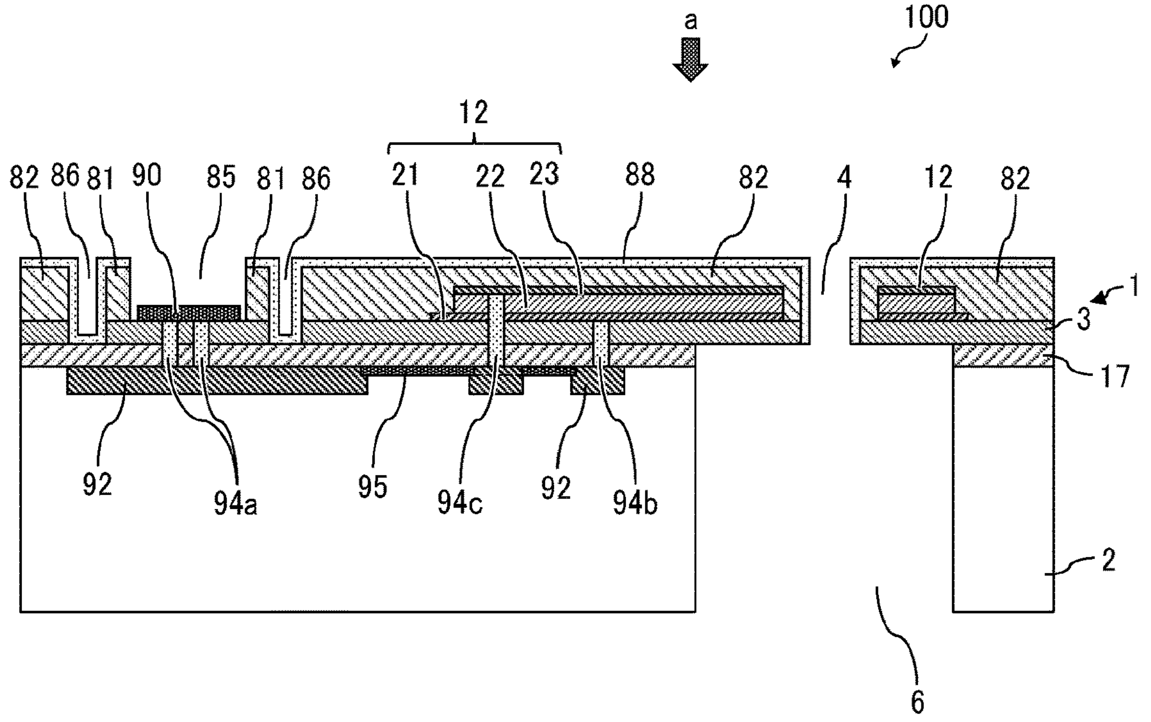
FIG. 1 is a schematic cross-sectional view illustrating an example of a liquid discharge head according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a liquid discharge head, a liquid discharge device, and a liquid discharge apparatus according to embodiments of the present disclosure is described with reference to the drawings. It is to be noted that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are exhibited.

A liquid discharge head according the present disclosure includes a nozzle layer having a nozzle through which a liquid is discharged, a liquid chamber substrate, and a drive circuit. The nozzle layer includes a vibration layer having a first side and a second side opposite to the first side, a piezoelectric actuator adjacent to the nozzle and over the first side, a circuit connection over the first side, a first protective layer around the circuit connection, a second protective layer over the piezoelectric actuator, a first water-resistant film over a surface of the first protective layer, and a second water-resistant film over a surface of the second protective layer. The liquid is discharged through the nozzle in a direction from the second side toward the first side. The second protective layer is separated from the first protective layer. The first protective layer defines an opening above the circuit connection. The liquid chamber substrate has a liquid chamber communicating with the nozzle. The drive circuit is disposed over the second side and connected to the circuit connection to drive the piezoelectric actuator.

A liquid discharged from the liquid discharge head according to the present embodiment is not particularly limited and can be appropriately changed. The liquid discharge head that discharges ink as the liquid is also referred to as an inkjet head.

Figure 2:
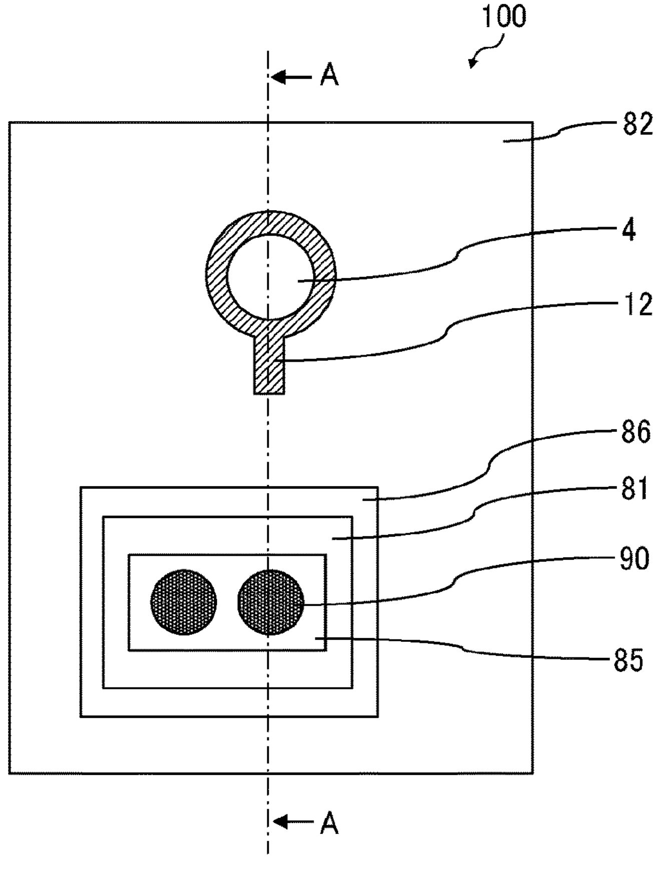
FIG. 2 is a schematic plan view illustrating the example of the liquid discharge head in FIG. 1.

A liquid discharge head 100 according to the present embodiment is described with reference to FIGS. 1 and 2. FIG. 1 is a schematic cross-sectional view of the liquid discharge head 100 according to the present embodiment. FIG. 2 is a schematic plan view of the liquid discharge head 100 according to the present embodiment as viewed from a nozzle surface side (also referred to as a liquid discharge side from which liquid is discharged). That is, the liquid discharge head 100 illustrated in FIG. 2 is viewed in the direction indicated by arrow a in FIG. 1, and FIG. 1 is the schematic cross-sectional view taken along line A-A in FIG. 2.

As illustrated in FIG. 1, the liquid discharge head 100 according to the present embodiment includes a nozzle layer 1, a liquid chamber substrate 2, and a drive circuit 92.

The nozzle layer 1 includes a vibration layer 3, a piezoelectric actuator 12, an electrode pad 90, a first protective layer 81, and a second protective layer 82. The electrode pad 90 is an example of a circuit connection.

The nozzle layer 1 has a nozzle 4, and liquid (for example, ink) is discharged from the nozzle 4. The liquid chamber substrate 2 and a part of the nozzle layer 1 define a liquid chamber 6, and the piezoelectric actuator 12 is driven to discharge the liquid in the liquid chamber 6 from the nozzle 4.

The vibration layer 3 vibrates when the piezoelectric actuator 12 is driven. The material of the vibration layer 3 is not particularly limited, and for example, aluminum oxide ($Al_2O_3$), silicon nitride (SiN), silicon dioxide ($SiO_2$), high temperature oxide (HTO), or a combination of some of these materials that are laminated one on another can be used.

The liquid chamber substrate 2 has the liquid chamber 6 communicating with the nozzle 4. A circuit protective layer 17 is disposed between the liquid chamber substrate 2 and the vibration layer 3. The circuit protective layer 17 protects the drive circuit 92 and an inter-layer wiring layer 95.

The material of the circuit protective layer 17 is not particularly limited, and examples thereof include a polytetrafluoroethylene (PTFE)-based resin. A position where the circuit protective layer 17 is formed is not particularly limited, and for example, the circuit protective layer 17 is formed so as to cover the drive circuit 92 and the inter-layer wiring layer 95. The nozzle layer 1 may include the circuit protective layer 17, or the liquid chamber substrate 2 may include the circuit protective layer 17.

The piezoelectric actuator 12 includes a lower electrode 21, a piezoelectric body 22, and an upper electrode 23. The lower electrode 21 may be a common electrode and the upper electrode 23 may be an individual electrode. Alternatively, the lower electrode 21 may be the individual electrode and the upper electrode 23 may be the common electrode.

The material of the piezoelectric body 22 is not particularly limited, and for example, lead zirconate titanate (PZT) can be used.

The materials of the lower electrode 21 and the upper electrode 23 are not particularly limited, and known electrode materials can be used. For example, platinum (Pt) may be used.

The piezoelectric actuator 12 (the piezoelectric body 22) is disposed adjacent to the nozzle 4 and over a side (first side) of the vibration layer 3 from which liquid is discharged (i.e., the nozzle surface side). In other words, the piezoelectric actuator 12 is disposed on the vibration layer 3. Since the piezoelectric actuator 12 is disposed at such a position, a diaphragm plate is unnecessary, which applies pressure to liquid sucked and introduced into the liquid chamber 6 to discharge the liquid from the nozzle 4.

In the comparative example, which is not included in embodiments of the present disclosure, a nozzle substrate, a liquid chamber substrate, and the diaphragm plate on which the piezoelectric actuator is disposed are laminated in this order. The configuration of the entire liquid discharge head 100 (e.g., the inkjet head) according to the present embodiment can be simplified as compared with the comparative example. In addition, in a manufacturing process of the liquid discharge head 100 according to the present embodiment, a process of manufacturing the diaphragm plate, a process of bonding the nozzle substrate, the liquid chamber substrate, a substrate including the piezoelectric actuator, and a frame substrate, and an assembly process can be omitted, thereby significantly reducing manufacturing costs of the liquid discharge head 100.

The piezoelectric actuator 12 is connected to the drive circuit 92 to drive the piezoelectric actuator 12, via connection electrodes 94*b* and 94*c*. For example, the lower electrode 21 is connected to the drive circuit 92 via the connection electrode 94*b*, and the upper electrode 23 is connected to the drive circuit 92 via the connection electrode 94*c*.

The drive circuit 92 is connected to the electrode pad 90 via a connection electrode 94*a*, and is energized from a power supply unit via the electrode pad 90 and the connection electrode 94*a*. The drive circuit 92 is disposed over a side (second side) opposite to the side (first side) where the electrode pad 90 is disposed across the vibration layer 3. The drive circuit 92 is preferably disposed, but not limited to, on one side of the liquid chamber substrate 2. In such a case, the drive circuit 92 can be easily formed.

Note that the connection electrodes 94*a*, 94*b*, and 94*c* may be collectively referred to as connection electrodes 94 unless distinguished.

The drive circuit 92 is not particularly limited, but may be, for example, a complementary metal oxide semiconductor (CMOS) circuit. Although not particularly limited, the drive circuit 92 is divided into multiple portions connected to the electrode pad 90 and connected to the piezoelectric actuator 12 as illustrated in FIG. 1, and the multiple portions are connected to each other via the inter-layer wiring layer 95. As the material of the inter-layer wiring layer 95, for example, a known electrode material can be used.

The electrode pad 90 (i.e., the circuit connection) is disposed over the liquid discharge side (nozzle surface side) of the vibration layer 3, and is connected to the drive circuit 92 via the connection electrode 94*a*. Here, two connection electrodes 94*a* are illustrated in FIG. 1, but the number of the connection electrodes 94*a* is not limited to two. Two connection electrodes 94*b* and 94*c* connected to the lower electrode 21 and the upper electrode 23 of the piezoelectric actuator 12 correspond to the two connection electrodes 94*a*, respectively.

As illustrated in FIG. 1, in the present embodiment, the first and second protective layers 81 and 82 are disposed over the liquid discharge side (nozzle surface side). The first protective layer 81 is disposed around the electrode pad 90 and defines an opening 85 above the electrode pad 90. The second protective layer 82 is disposed over the piezoelectric actuator 12. The first protective layer 81 and the second protective layer 82 can protect, for example, at least one of the piezoelectric actuator 12, the vibration layer 3, or the electrode pad 90, thereby preventing deterioration of these components.

The materials of the first protective layer 81 and the second protective layer 82 are not particularly limited, and for example, a polyimide-based resin can be used. The first protective layer 81 and the second protective layer 82 may be made of the same material or different materials. From the viewpoint of ease of manufacturing, the same material is preferable. Positions where the first protective layer 81 and the second protective layer 82 are formed are not particularly limited. The first protective layer 81 and the second protective layer 82 are preferably formed in the entire area or substantially the entire area of the nozzle layer 1.

As illustrated in FIG. 1, the first protective layer 81 is disposed around the electrode pad 90 and defines the opening 85 above the electrode pad 90. In the example illustrated in FIG. 1, the first protective layer 81 and the electrode pad 90 are spaced apart, but the first protective layer 81 and the electrode pad 90 may be in contact with each other in another example. The first protective layer 81 does not necessarily surround the entire periphery of the electrode pads 90 as illustrated in FIG. 2. For example, the first protective layer 81 may not be continuous around the electrodes pads 90 and may have separated portions.

As illustrated in FIG. 1, the second protective layer 82 is disposed over the piezoelectric actuator 12. A portion of the second protective layer 82 and the vibration layer 3 is opened to form the nozzle 4. The opening of the vibration layer 3 may be referred to as the nozzle 4, or the opening of the vibration layer 3 and the second protective layer 82 may be referred to as the nozzle 4.

The liquid discharge head 100 according to the present embodiment includes a water-resistant film 88 disposed over the surface of the first protective layer 81 and the surface of the second protective layer 82. The water-resistant film 88 can prevent moisture from permeating into the first and second protective layers 81 and 82. Therefore, the piezoelectric actuator 12 is prevented from deteriorating in performance due to the moisture permeating through the second protective layer 82. Therefore, the life of the liquid discharge head 100 can be extended, and the reliability of the liquid discharge head 100 can be improved.

As the water-resistant film 88, for example, $Al_2O_3$, tantalum dioxide ($TaO_2$), aluminum nitride (AlN) can be used.

The water-resistant film 88 is omitted in FIG. 2 for simplicity.

In the present embodiment, the first protective layer 81 and the second protective layer 82 are not continuous. As illustrated in FIG. 1, the first protective layer 81 and the second protective layer 82 are separated from each other by a separation groove 86. That is, the first protective layer 81 and the second protective layer 82 are discontinuous. With such a structure, in the liquid discharge head 100 in which the piezoelectric actuator 12 and the electrode pad 90 (circuit connection) are formed in the nozzle layer 1, the piezoelectric actuator 12 is prevented from absorbing moisture from the opening 85 above the electrode pad 90, thereby suppressing the deterioration of piezoelectric performance of the piezoelectric actuator 12.

In the comparative example, the piezoelectric actuator may absorb moisture from the opening above the electrode pad, causing the deterioration of piezoelectric performance of the piezoelectric actuator. If moisture in the outside air is absorbed (enters) from the opening above the electrode pad, the moisture erodes the piezoelectric actuator, causing the piezoelectric actuator to deteriorate. The moisture absorption may shorten the life of the inkjet head and may decrease the reliability of the inkjet head.

The comparative example that is not included in embodiments of the present disclosure is described with reference to FIG. 9. In the comparative example, the water-resistant film 88 is disposed on the surface of a protective layer 83. In this comparative example, the water-resistant film 88 is not disposed on a side face of the protective layer 83 facing the opening 85 above the electrode pad 90, and the side face without the water-resistant film 88 is exposed to the outside air. Therefore, moisture in the outside air is absorbed through the protective layer 83 and reaches the piezoelectric actuator 12. That is, the moisture is absorbed as indicated by the blank arrow in FIG. 9. As a result, the piezoelectric actuator 12 may deteriorate.

On the other hand, in the present embodiment, the first protective layer 81 and the second protective layer 82 are not continuous with each other. Accordingly, even if moisture in the outside air enters through the side face facing the opening 85 without the water-resistant film 88, the moisture does not reach and erode the piezoelectric actuator 12. If the first protective layer 81 and the second protective layer 82 are continuous, for example, if the separation groove 86 is not provided, moisture enters between the first and second protective layers 81 and 82 and the vibration layer 3 from the opening 85 and reaches the piezoelectric actuator 12. On the other hand, the first protective layer 81 and the second protective layer 82 are not continuous in the present embodiment. Accordingly, even when moisture enters between the first protective layer 81 and the vibration layer 3 from the opening 85, the moisture reaches only the separation groove 86. Therefore, the moisture does not affect the piezoelectric actuator 12.

Although the separation groove 86 is disposed between the first protective layer 81 and the second protective layer 82 in the present embodiment, the water-resistant film 88 covering the surface (and the side surface) of the second protective layer 82 that covers the piezoelectric actuator 12 can prevent moisture from entering between the second protective layer 82 and the vibration layer 3 from the separation groove 86.

The position where the water-resistant film 88 is formed can be changed as appropriate, but as illustrated in FIG. 1, the water-resistant film 88 over the surface of the first protective layer 81 (i.e., a first water-resistant film) and the water-resistant film 88 over the surface of the second protective layer 82 (i.e., a second water-resistant film) are preferably continuous. Such a structure can prevent moisture from entering from the separation groove 86. As a result, the moisture does not permeate into (reach) the piezoelectric actuator 12.

Next, a liquid discharge head 100 according to another embodiment of the present disclosure is described. Descriptions of the same items as those in the above embodiment are omitted.

Figure 3:
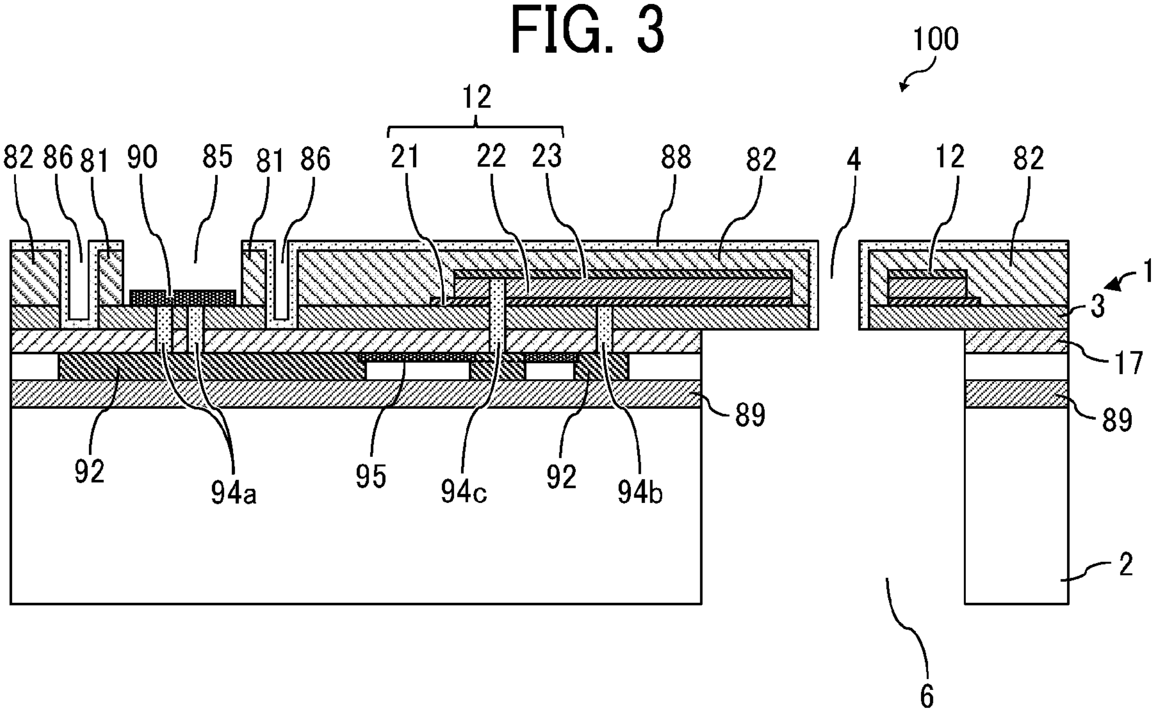
FIG. 3 is a schematic cross-sectional view illustrating another example of the liquid discharge head according to an embodiment of the present disclosure.

FIG. 3 illustrates the liquid discharge head 100 according to the present embodiment. FIG. 3 is the cross-sectional view similar to FIG. 1. In the liquid discharge head 100 according to the present embodiment, the liquid chamber substrate 2 is a silicon on insulator (SOI) substrate. In the present embodiment, the SOI substrate includes an insulating layer 89 on the side on which the drive circuit 92 is disposed.

According to the present embodiment, the liquid chamber substrate 2 is the SOI substrate, and in particular, the SOI substrate includes the insulating layer 89 on the side on which the drive circuit 92 is disposed, thereby reducing a stray capacitance and a leakage current generated in the drive circuit 92. Such a structure can increase the speed of the printing process using the liquid discharge head 100 according to the present embodiment and improve the power saving of the liquid discharge head 100 and the withstand voltage and reliability of the drive circuit 92.

The structure of the drive circuit 92 according to a comparative example may generate a stray capacitance and a leakage current from the drive circuit 92, thereby generating a delay of a signal or a leakage current to the substrate. The structure according to the present embodiment can prevent such a situation.

Also in the present embodiment, the water-resistant film 88 described above is provided, thereby further improving the reliability.

Next, a process of manufacturing the liquid discharge head 100 according to the above embodiments is described with reference to FIGS. 4A to 4L, which are schematic cross-sectional views similar to FIGS. 1 and 3 described above. Here, an example in which a normal silicon substrate is used is described, but even in the case where the SOI substrate described above is used, the manufacturing process basically has the same flow.

Figure 4A:
FIG. 4A to 4L are schematic cross-sectional views of the liquid discharge head according to embodiments of the present disclosure, illustrating an example of a manufacturing process.
Figure 4B:
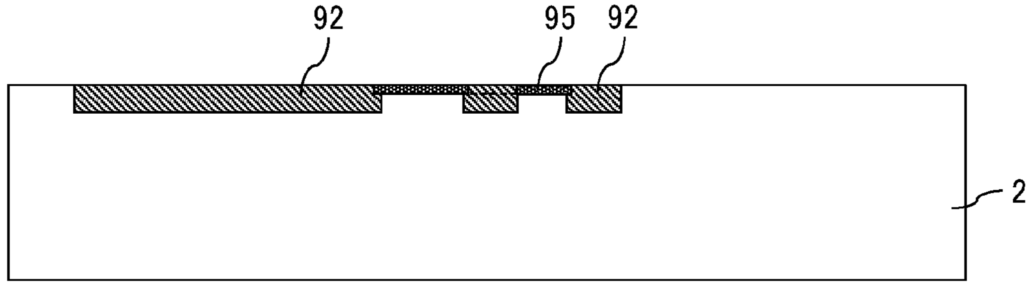

First, a silicon substrate is prepared as the liquid chamber substrate 2 as illustrated in FIG. 4A. The CMOS circuit as the drive circuit 92 and the inter-layer wiring layer 95 that connects the drive circuits 92 are formed by a general method as illustrated in FIG. 4B.

Figure 4C:
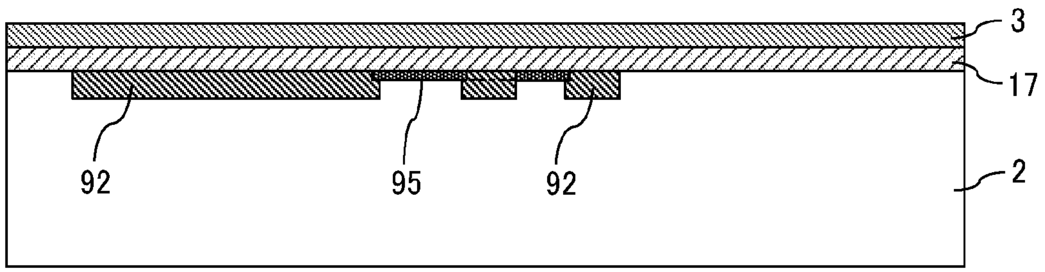

Next, the circuit protective layer 17 that protects the drive circuit 92 and the inter-layer wiring layer 95 is formed. Further, the vibration layer 3 is formed over the circuit protective layer 17 as illustrated in FIG. 4C. As the material of the circuit protective layer 17, for example, the PTFE-based resin is used, and as the material of the vibration layer 3, for example, $Al_2O_3$, SiN, $SiO_2$, HTO, or a combination of some of these materials that are laminated one on another is used.

Figure 4D:
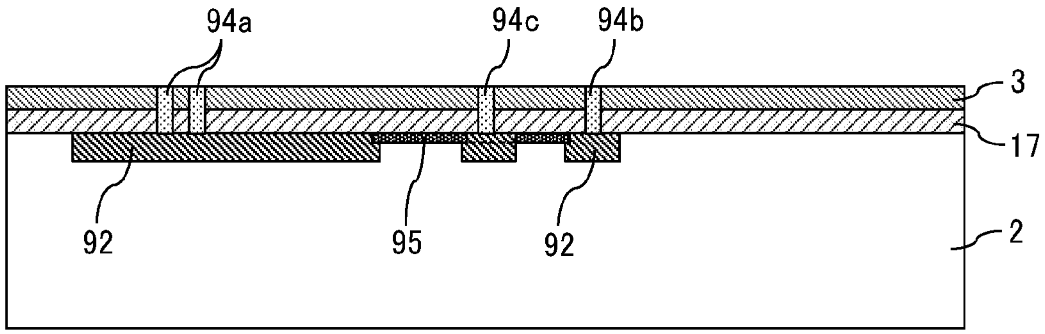

Next, contact portions (i.e., the connection electrodes 94*a*) that connect the drive circuit 92 and the electrode pad 90, and contact portions (i.e., the connection electrodes 94*b* and 94*c*) that connect the drive circuit 92 and the piezoelectric actuator 12 are formed as illustrated in FIG. 4D.

Figure 4E:
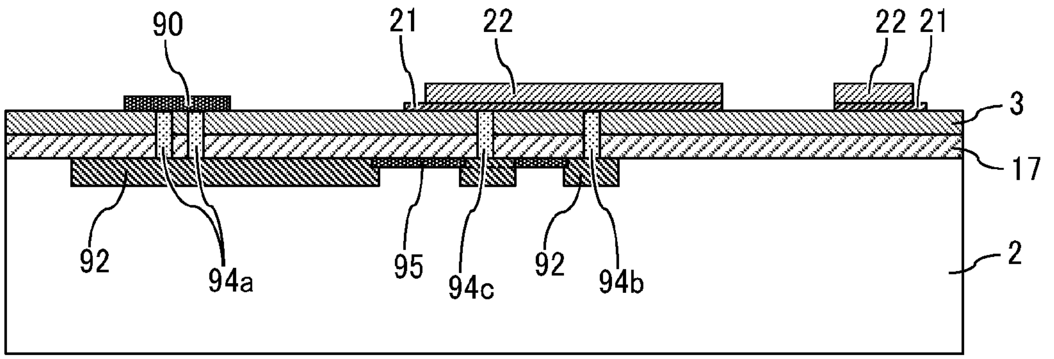

The lower electrode 21 is formed over the vibration layer 3 from Pt as illustrated in FIG. 4E. A film formation pattern of the lower electrode 21 can be formed by photolithography and etching. As illustrated in FIG. 4E, the electrode pad 90 is formed, which serves as the circuit connection for supplying power to the drive circuit 92. Further, as illustrated in FIG. 4E, with a mask on the lower electrode 21 (the liquid chamber substrate 2), the piezoelectric body 22 is formed from a piezoelectric material by a process such as chemical vapor deposition (CVD) or physical vapor deposition (PVD), and then the mask is removed. As the piezoelectric material, various materials such as PZT and the like can be selected.

Figure 4F:
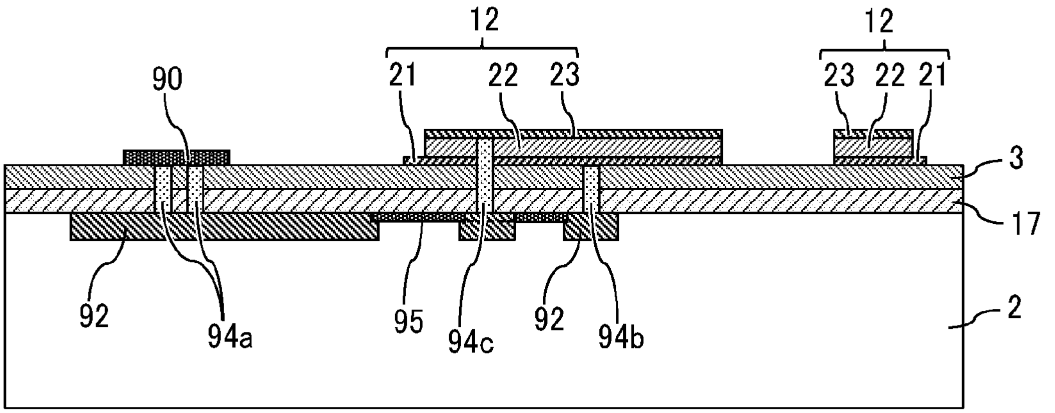

Next, with a mask for wiring, a film is formed from an electrode material, and then the mask is removed. As a result, the upper electrode 23 is formed and simultaneously conducted to the connection electrode 94*c* as illustrated in FIG. 4F.

Figure 4G:
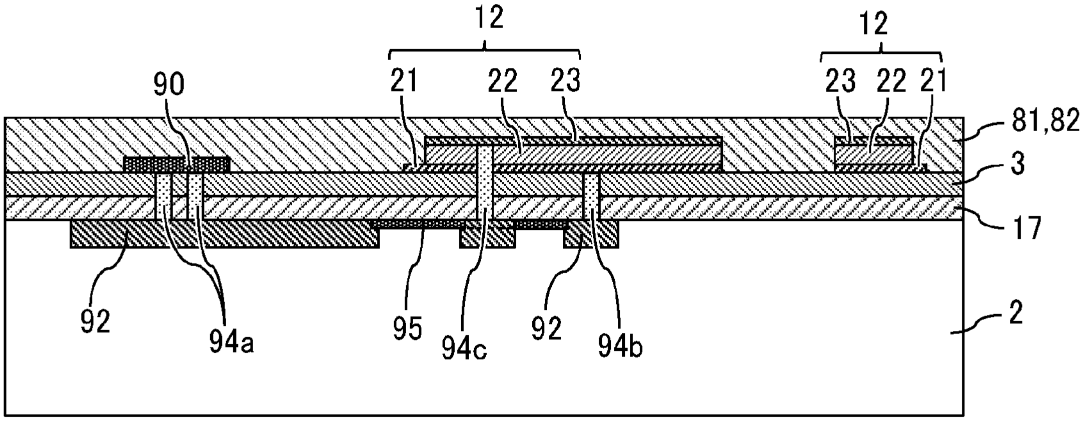

Next, a protective layer 81 and 82 is formed over the upper surfaces of the piezoelectric actuator 12 and the electrode pad 90 as illustrated in FIG. 4G. The piezoelectric actuator 12 surrounds the position where the nozzle 4 is to be formed. In this example, the protective layer 81 and 82 is formed in the entire area of the nozzle layer 1, but the area on which the protective layer 81 and 82 is formed is not limited thereto. Note that, in this example, the first protective layer 81 and the second protective layer 82 are made of the same material (for example, a polyimide-based resin) and collectively referred to as the protective layer 81 and 82, which is not separated here.

Figure 4H:
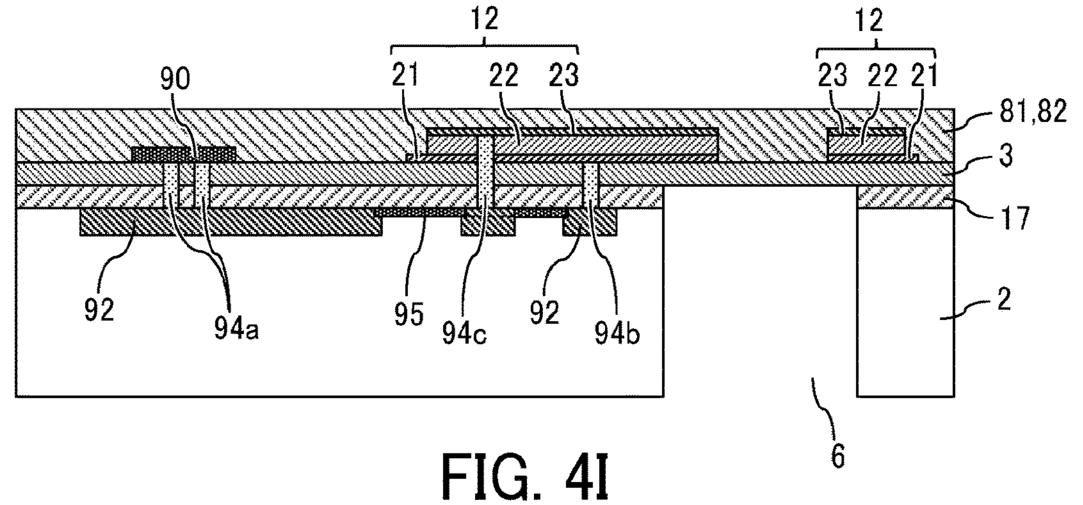

Next, the liquid chamber 6 is formed by photolithography and etching from the back surface (the side opposite to the piezoelectric actuator 12) of the liquid chamber substrate 2 as illustrated FIG. 4H. In this case, the vibration layer 3 serves as an etch stop layer.

Figure 4I:
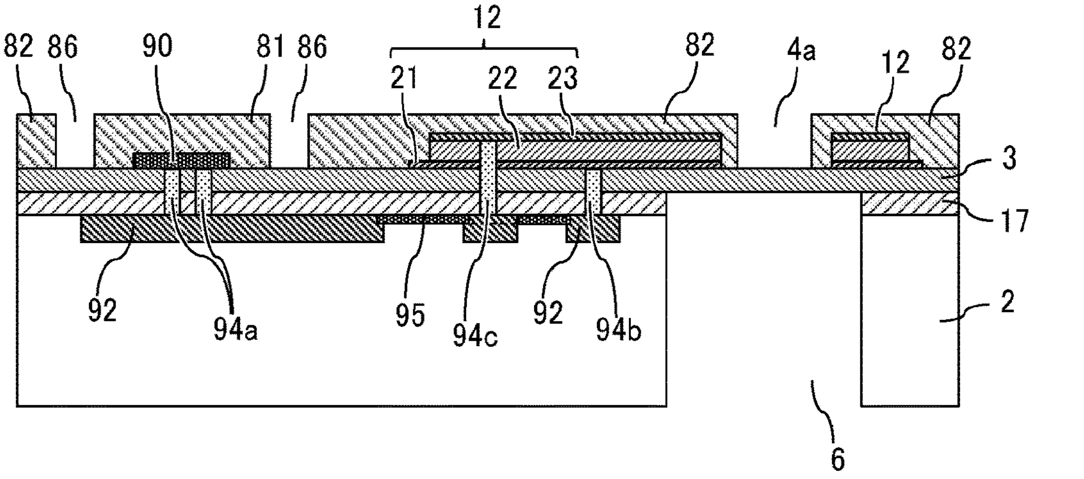

Next, the protective layer 81 and 82 formed in the entire area of the nozzle layer 1 is processed by photolithography to form a nozzle recess 4*a* as illustrated in FIG. 4I. Thus, at a nozzle formation position surrounded by the piezoelectric actuator 12, the protective layer 81 and 82 is opened so as to coincide with the shape of the nozzle 4 to be formed. Further, as illustrated in FIG. 4I, the separation groove 86 that separates the protective layer 81 and 82 into the first protective layer 81 and the second protective layer 82 is formed.

Figure 4J:
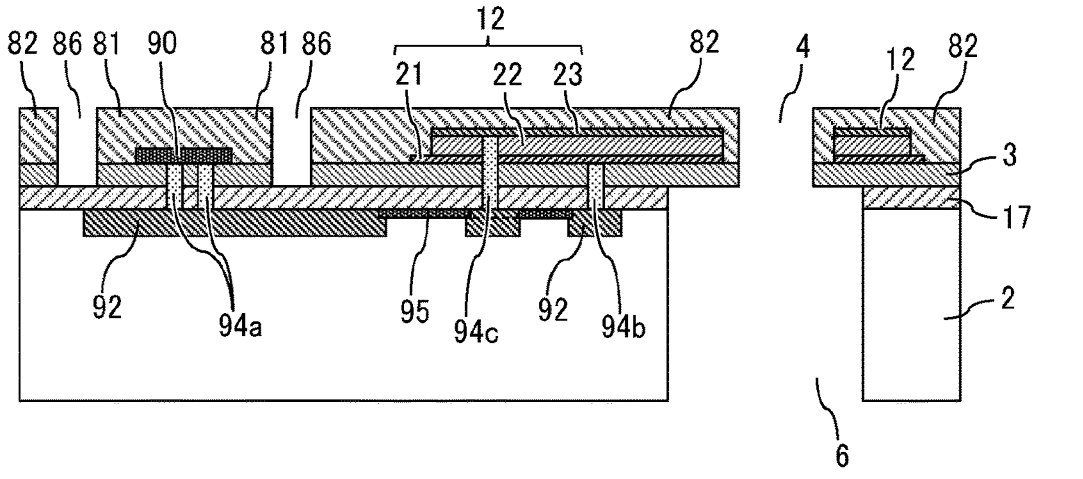

Next, the nozzle layer 1 (the vibration layer 3) is etched using the second protective layer 82, which is opened by photolithography as described above, as a mask to form the nozzle 4 as illustrated in FIG. 4J. The vibration layer 3 in the separation groove 86 around the electrode pad 90 is also etched at the same time, but the drive circuit 92 is protected by the circuit protective layer 17 under the vibration layer 3.

Figure 4K:
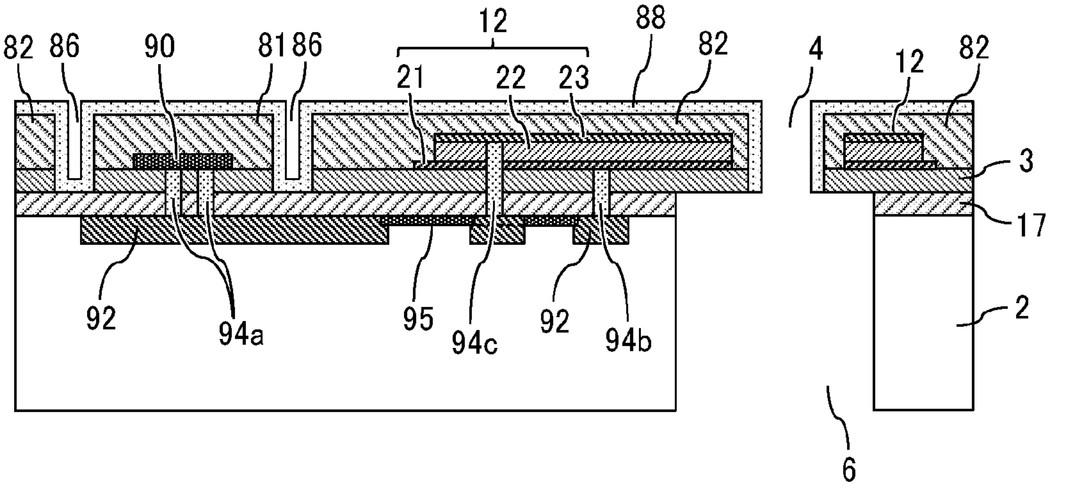

Next, the water-resistant film 88 is formed from the nozzle surface side as illustrated in FIG. 4K. The water-resistant film 88 is formed over the surface of the first protective layer 81 and the surface of the second protective layer 82, for example, by an atomic layer deposition (ALD) method.

Figure 4L:
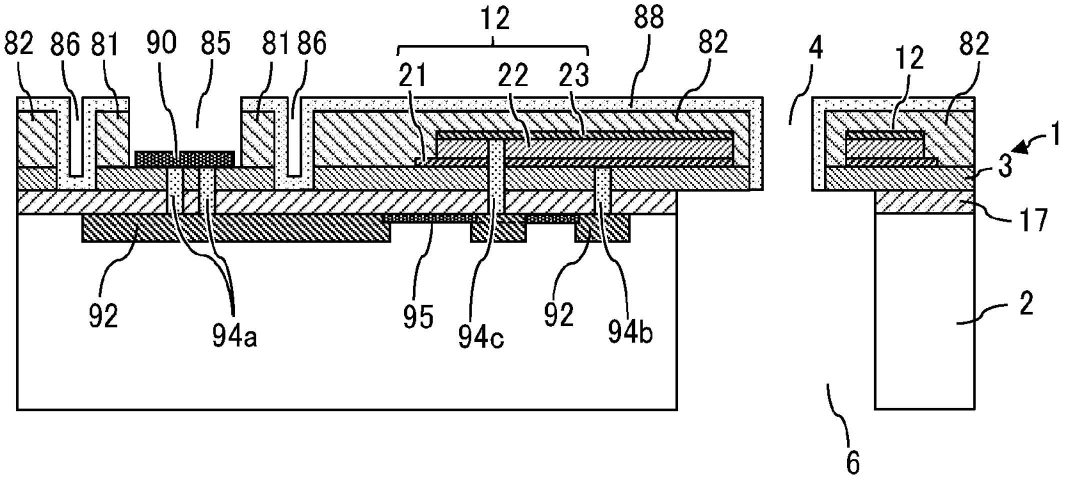

Next, portions of the water-resistant film 88 and the first protective layer 81 above the electrode pad 90 are opened with a mask to form the opening 85 as illustrated in FIG. 4L. As a result, a component of the liquid discharge head 100 according to the present embodiment is obtained.

Thereafter, the component is combined with another component such as a common liquid chamber substrate which is separately manufactured, thereby completing the liquid discharge head 100 having the common liquid chamber. Other components may be combined as appropriate.

As described above, in the manufacturing process of the liquid discharge head 100 according to the present embodiment, the process of manufacturing the diaphragm plate, the process of bonding the nozzle substrate, the liquid chamber substrate, the substrate including the piezoelectric actuator, and the frame substrate, and the assembly process can be omitted, thereby significantly reducing manufacturing costs of the liquid discharge head 100.

Figure 5:
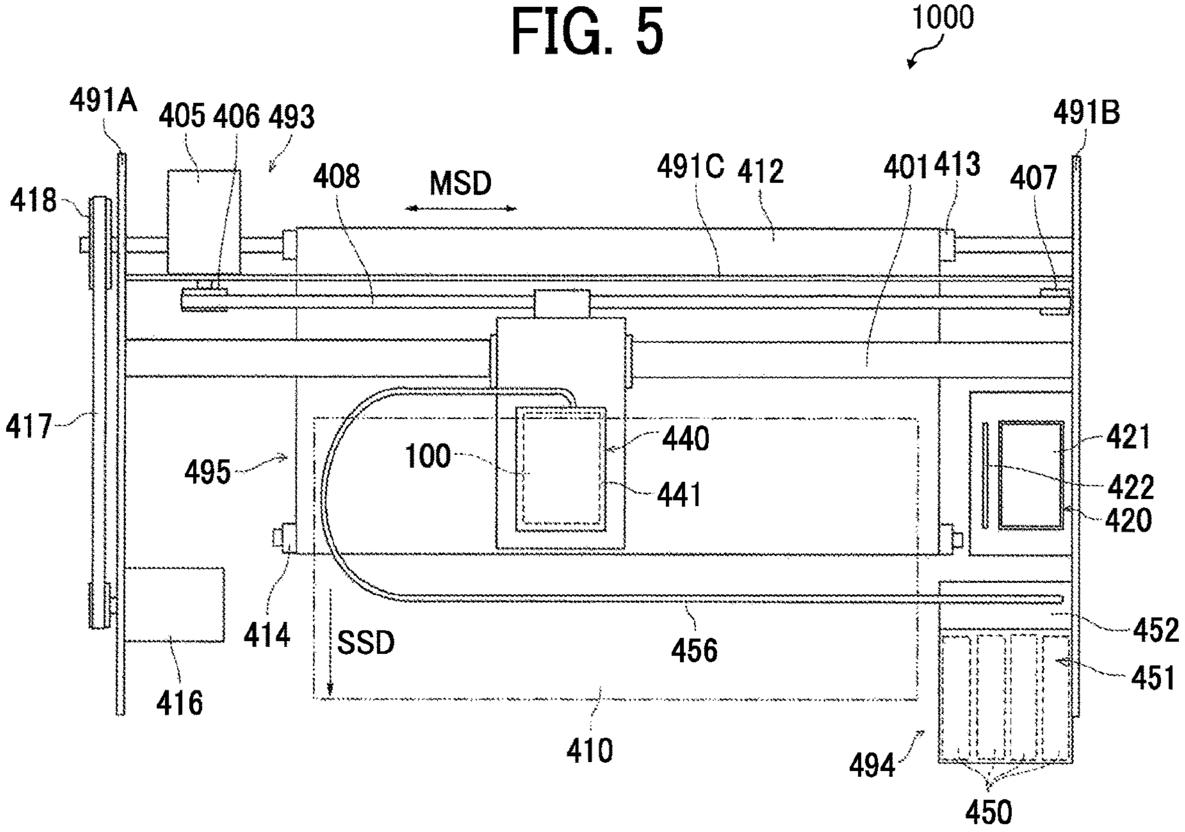
FIG. 5 is a schematic view illustrating an example of a liquid discharge apparatus according to embodiments of the present disclosure.
Figure 6:
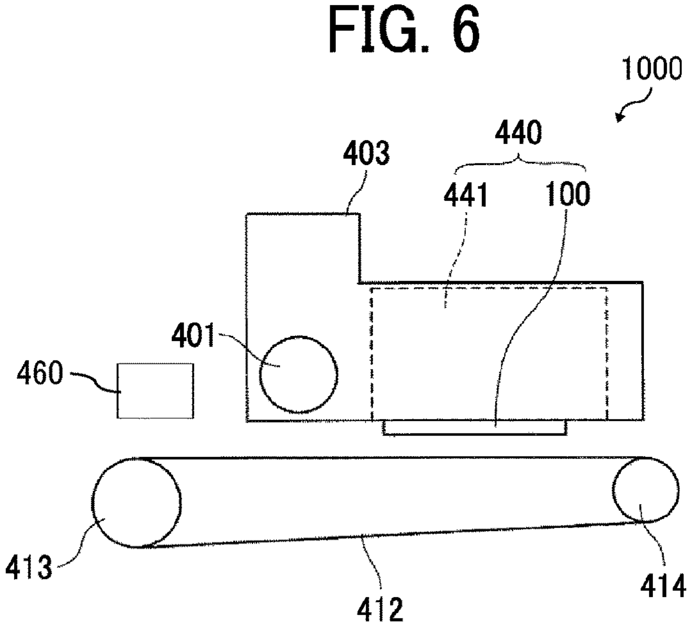
FIG. 6 is a schematic view illustrating the example of the liquid discharge apparatus in FIG. 5.

Next, an example of a liquid discharge apparatus according to the present disclosure is described with reference to FIGS. 5 and 6. FIG. 5 is a plan view of a part of a liquid discharge apparatus 1000. FIG. 6 is a side view of the part of the liquid discharge apparatus 1000 in FIG. 5.

The liquid discharge apparatus 1000 is a serial-type apparatus in which a main-scanning moving mechanism 493 reciprocates a carriage 403 in the main scanning directions indicated by arrow MSD in FIG. 5. The main-scanning moving mechanism 493 includes a guide 401, a main-scanning motor 405, and a timing belt 408. The guide 401 is bridged between left and right side plates 491A and 491B to moveably hold the carriage 403. The main-scanning motor 405 reciprocates the carriage 403 in the main scanning direction via the timing belt 408 looped around a drive pulley 406 and a driven pulley 407.

The carriage 403 is mounted with a liquid discharge device 440 including a plurality of liquid discharge heads 100 according to the above described embodiments of the present disclosure and a head tank 441 as a single integrated unit. The plurality of liquid discharge heads 100 of the liquid discharge device 440 discharges color liquids of, for example, yellow (Y), cyan (C), magenta (M), and black (K). The liquid discharge head 100 is mounted on the liquid discharge device 440 such that a nozzle row including a plurality of nozzles 4 is arranged in the sub-scanning direction perpendicular to the main scanning direction. The liquid discharge head 100 discharges the color liquid downward.

A supply mechanism 494 disposed outside the liquid discharge head 100 supplies liquid stored in liquid cartridges 450 to the head tank 441 of the liquid discharge head 100.

The supply mechanism 494 includes a cartridge holder 451 which is a filling part to mount the liquid cartridges 450, a tube 456, a liquid feed unit 452 including a liquid feed pump, and the like. The liquid cartridge 450 is detachably mounted on the cartridge holder 451. The liquid feed unit 452 feeds the liquid from the liquid cartridge 450 to the head tank 441 via the tube 456.

The liquid discharge apparatus 1000 further includes a conveyance mechanism 495 to convey a sheet 410. The conveyance mechanism 495 includes a conveyance belt 412 as a conveyor and a sub-scanning motor 416 to drive the conveyance belt 412.

The conveyance belt 412 attracts the sheet 410 and conveys the sheet 410 to a position facing the liquid discharge head 100. The conveyance belt 412 is an endless belt stretched between a conveyance roller 413 and a tension roller 414. The sheet 410 can be attracted to the conveyance belt 412 by electrostatic attraction, air suction, or the like.

The conveyance belt 412 circumferentially moves in the sub-scanning direction indicated by arrow SSD in FIG. 5 as the conveyance roller 413 is rotationally driven by the sub-scanning motor 416 via a timing belt 417 and a timing pulley 418.

On one side of the carriage 403 in the main scanning direction, a maintenance mechanism 420 that maintains and recovers the liquid discharge head 100 is disposed lateral to the conveyance belt 412.

The maintenance mechanism 420 includes, for example, a cap 421 to cap the nozzle surface (i.e., the surface on which the nozzles 4 are formed) of the liquid discharge head 100 and a wiper 422 to wipe the nozzle surface.

The main-scanning moving mechanism 493, the supply mechanism 494, the maintenance mechanism 420, and the conveyance mechanism 495 are mounted onto a housing including the side plates 491A and 491B and a back plate 491C.

In the liquid discharge apparatus 1000 having the above-described configuration, the sheet 410 is fed and attracted onto the conveyance belt 412 and conveyed in the sub-scanning direction indicated by arrow SSD as the conveyance belt 412 circumferentially moves.

The liquid discharge apparatus further includes a head driver 460 to drive the liquid discharge head. The liquid discharge head 100 is driven by the head driver 460 in response to an image signal while moving the carriage 403 in the main scanning direction to discharge liquid onto the sheet 410 not in motion, thereby forming an image.

As described above, the liquid discharge apparatus 1000 includes the liquid discharge head 100 according to the above-described embodiments of the present disclosure, thus allowing stable formation of high-quality images.

Figure 7:
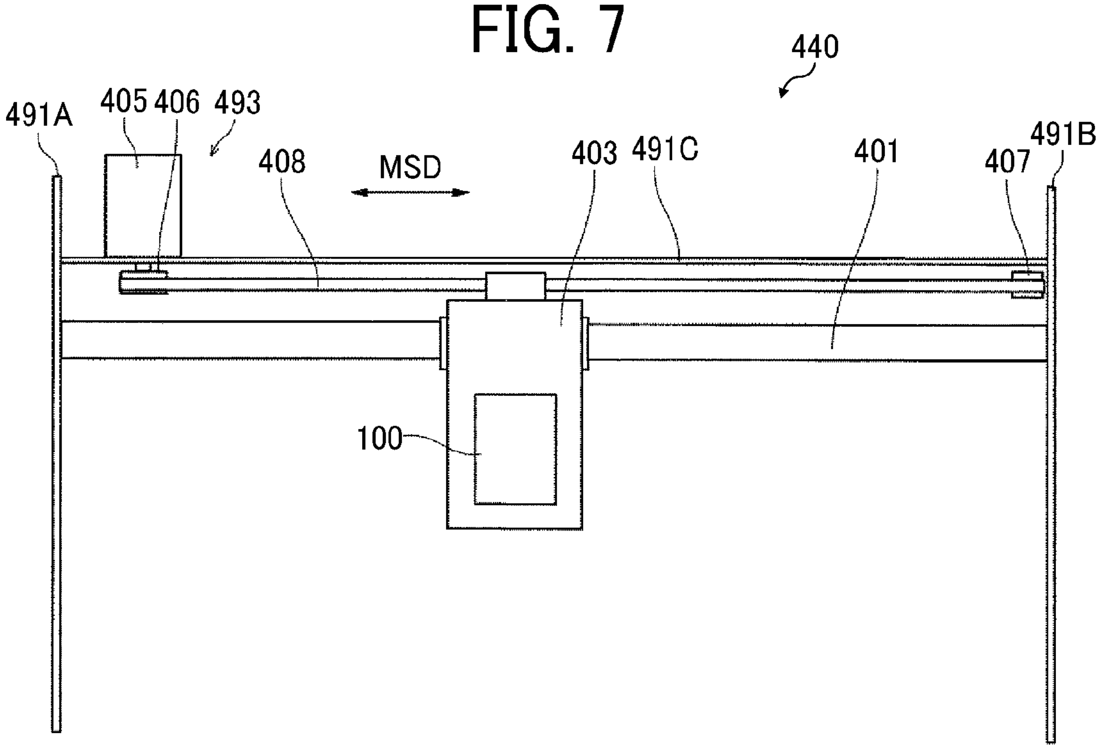
FIG. 7 is a schematic view illustrating an example of a liquid discharge device according to embodiments of the present disclosure.

Next, another example of the liquid discharge device 440 according to the present disclosure is described with reference to FIG. 7. FIG. 7 is a plan view illustrating a part of the liquid discharge device 440.

The liquid discharge device 440 includes the housing, the main-scanning moving mechanism 493, the carriage 403, and the liquid discharge head 100 among components of the liquid discharge apparatus 1000 described above. The side plates 491A and 491B, and the back plate 491C construct the housing.

Figure 8:
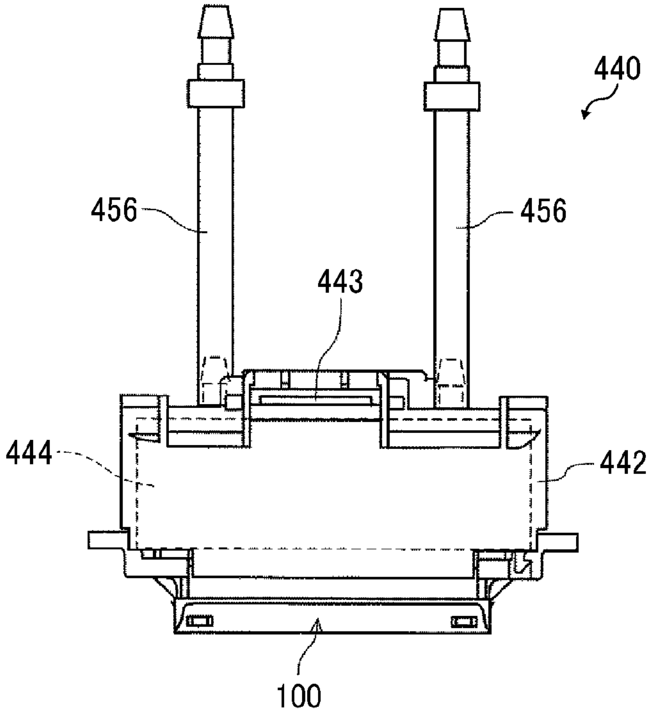
FIG. 8 is a schematic view illustrating another example of the liquid discharge device according to embodiments of the present disclosure.

The liquid discharge device 440 may further include at least one of the maintenance mechanism 420 and the supply mechanism 494, which may be attached to the side plate 491B Next, still another example of the liquid discharge device 440 according to the present disclosure is described with reference to FIG. 8. FIG. 8 is a front view of the liquid discharge device 440.

The liquid discharge device 440 includes the liquid discharge head 100 to which a channel component 444 is attached and tubes 456 connected to the channel component 444.

The channel component 444 is disposed inside a cover 442. In some embodiments, the liquid discharge device 440 may include the head tank 441 instead of the channel component 444. A connector 443 for electrically connecting to the liquid discharge head 100 is provided on an upper portion of the channel component 444.

In the above-described embodiments, the "liquid discharge apparatus" includes the liquid discharge head or the liquid discharge device, and the head driver of the liquid discharge apparatus drives the liquid discharge head (liquid discharge device) to discharge liquid. The liquid discharge apparatus may be, for example, an apparatus capable of discharging liquid to a material onto which liquid can adhere or an apparatus to discharge liquid toward gas or into liquid.

The "liquid discharge apparatus" may include devices relating to feeding, conveyance, and ejection of the material onto which liquid can adhere and also include a pre-treatment device and a post-processing device.

The "liquid discharge apparatus" may be, for example, an image forming apparatus to form an image on a sheet by discharging ink, or a three-dimensional apparatus to discharge a fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material onto which liquid is at least temporarily adhered, a material onto which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any materials onto which liquid is adhered, unless particularly limited.

Examples of the "material onto which liquid can adhere" include any materials onto which liquid can adhered even temporarily, such as paper, thread, fiber, fabric, leather, metal, plastic, glass, wood, ceramic, construction materials (e.g., wall paper or floor material), and cloth textile.

Examples of the "liquid" include ink, treatment liquid, DNA sample, resist, pattern material, binder, fabrication liquid, and solution or liquid dispersion containing amino acid, protein, or calcium.

The term "liquid discharge apparatus" may be an apparatus to relatively move the liquid discharge head and the material onto which liquid can adhere. However, the liquid discharge apparatus is not limited to such an apparatus. Examples of the liquid discharge apparatus include a serial type apparatus which moves the liquid discharge head, and a line type apparatus which does not move the liquid discharge head.

Examples of the "liquid discharge apparatus" further include a treatment liquid coating apparatus to discharge a treatment liquid to a sheet surface to coat the sheet with the treatment liquid to reform the sheet surface and an injection granulation apparatus to discharge a composition liquid including a raw material dispersed in a solution from a nozzle to granulate fine particles of the raw material.

The "liquid discharge device" refers to a liquid discharge head integrated with functional components or mechanisms, i.e., an assembly of components related to liquid discharge. For example, the "liquid discharge device" includes a combination of the liquid discharge head with at least one of a head tank, a carriage, a supply mechanism, a maintenance mechanism, or a main-scanning moving mechanism.

Here, the integrated unit may be, for example, a combination in which the liquid discharge head and a functional part(s) are secured to each other through, e.g., fastening, bonding, or engaging, and a combination in which one of the liquid discharge head and a functional part(s) is movably held by another. The liquid discharge head may be detachably attached to the functional part(s) or unit(s) each other.

Examples of the liquid discharge device include the liquid discharge device 440 in which a liquid discharge head and a head tank are integrated, as illustrated in FIG. 6. Alternatively, the liquid discharge head and the head tank coupled (connected) to each other via a tube or the like may form the liquid discharge device as a single unit. Here, a unit including a filter may further be added to a portion between the head tank and the liquid discharge head.

In another example, the liquid discharge device may be an integrated unit in which a liquid discharge head is integrated with a carriage.

As yet another example, the liquid discharge device is a unit in which the liquid discharge head and the main-scanning moving mechanism are combined into a single unit. The liquid discharge head is movably held by a guide that is a part of the main-scanning moving mechanism. Examples of the liquid discharge device further include those in which a liquid discharge head, a carriage, and a main-scanning moving mechanism are integrated, as illustrated in FIG. 7.

In another example, the cap that forms a part of the maintenance mechanism is secured to the carriage mounting the liquid discharge head so that the liquid discharge head, the carriage, and the maintenance mechanism are integrated as a single unit to form the liquid discharge device.

Further, in still another example, the liquid discharge device includes tubes connected to the head tank or the liquid discharge head mounting the channel component so that the liquid discharge head and the supply mechanism are integrated as a single unit, as illustrated in FIG. 8.

The main-scanning moving mechanism may be a guide only. The supply mechanism may be a tube(s) only or a loading device only.

The liquid discharge head is not limited in the type of pressure generator used. For example, a piezoelectric actuator (which may use a laminated piezoelectric element), a thermal actuator using a thermoelectric conversion element such as a thermal resistor, and an electrostatic actuator including a diaphragm and a counter electrode can be used.

In the present specification, the terms "image formation," "recording," "printing," "image printing," and "fabricating" used herein may be used synonymously with each other.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

REFERENCE SIGNS LIST

1 Nozzle layer
3 Vibration layer
4 Nozzle
6 Liquid chamber
12 Piezoelectric actuator
17 Circuit protective layer
21 Lower electrode
22 Piezoelectric body
23 Upper electrode
81 First protective layer
82 Second protective layer
85 Opening
86 Separation groove
88 Water-resistant film
89 Insulating layer
90 Electrode pad
92 Drive circuit
94 Connection electrode
95 Inter-layer wiring layer

The invention claimed is:

1. A liquid discharge head comprising:

a nozzle layer having a nozzle through which a liquid is discharged, the nozzle layer including:

a vibration layer having a first side and a second side opposite to the first side, the liquid being discharged through the nozzle in a direction from the second side toward the first side;

a piezoelectric actuator adjacent to the nozzle and over the first side;

a circuit connection over the first side;

a first protective layer around the circuit connection, the first protective layer defining an opening above the circuit connection;

a second protective layer over the piezoelectric actuator, the second protective layer being completely separated from the first protective layer that is located around the circuit connection;

a first water-resistant film over a surface of the first protective layer; and a second water-resistant film over a surface of the second protective layer;

a liquid chamber substrate having a liquid chamber communicating the nozzle; and a drive circuit over the second side, the drive circuit being connected to the circuit connection and configured to drive the piezoelectric actuator.

2. The liquid discharge head according to claim 1, wherein the first water-resistant film over the surface of the first protective layer and the second water-resistant film over the surface of the second protective layer are continuous.

3. The liquid discharge head according to claim 1, wherein the drive circuit is on one side of the liquid chamber substrate.

4. The liquid discharge head according to claim 1, wherein the liquid chamber substrate is a silicon on insulator substrate.

5. The liquid discharge head according to claim 4, wherein the silicon on insulator substrate includes an insulating layer on a side on which the drive circuit is disposed.

6. A liquid discharge device comprising:

the liquid discharge head according to claim 1; and at least one of a head tank to store the liquid to be supplied to the liquid discharge head, a carriage to mount the liquid discharge head, a supplier to supply the liquid to the liquid discharge head, a maintainer to maintain the liquid discharge head, or a main-scanning mover to move the liquid discharge head in a main scanning direction, wherein the at least one of the head tank, the carriage, the supplier, the maintainer, or the main-scanning mover is integrated with the liquid discharge head as a single unit.

7. A liquid discharge device comprising the liquid discharge head according to claim 1, the liquid discharge head including a plurality of liquid discharge heads.

8. The liquid discharge device according to claim 7, further comprising:

at least one of a head tank to store the liquid to be supplied to the liquid discharge head, a carriage to mount the liquid discharge head, a supplier to supply the liquid to the liquid discharge head, a maintainer to maintain the liquid discharge head, or a main-scanning mover to move the liquid discharge head in a main scanning direction, wherein the at least one of the head tank, the carriage, the supplier, the maintainer, or the main-scanning mover is integrated with the liquid discharge head as a single unit.

9. A liquid discharge apparatus comprising:

the liquid discharge head according to claim 1; and a head driver to drive the liquid discharge head to discharge the liquid.

10. A liquid discharge apparatus comprising the liquid discharge device according to claim 7; and a head driver to drive the liquid discharge device to discharge the liquid.

11. The liquid discharge head according to claim 1, wherein a separation groove separates the second protective layer from the first protective layer.

12. The liquid discharge head according to claim 2, wherein a separation groove separates the second protective layer from the first protective layer.

13. The liquid discharge head according to claim 2, wherein the drive circuit is on one side of the liquid chamber substrate.

14. A liquid discharge device comprising:

the liquid discharge head according to claim 1; and at least one of a head tank to store the liquid to be supplied to the liquid discharge head, a carriage to mount the liquid discharge head, a supplier to supply the liquid to the liquid discharge head, a maintainer to maintain the liquid discharge head, or a main-scanning mover to move the liquid discharge head in a main scanning direction.

* * * * *